Nov. 4, 1958 T. B. KOHLER 2,858,718
COMPOSITE TOOL BITS FOR SUBSTANTIALLY AXIALLY
FED PLUNGE TYPE TOOLS
Filed Dec. 19, 1955 3 Sheets-Sheet 1

INVENTOR.
Theodor B. Kohler
BY
Attorney

INVENTOR.
Theodor B. Kohler
BY
Attorney

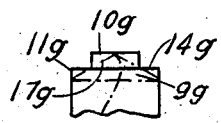
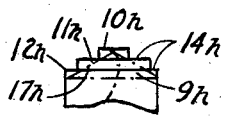
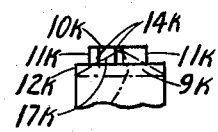
Fig 25　　　Fig 29　　　Fig 33
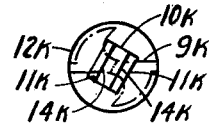
Fig 26　　　Fig 30　　　Fig 34
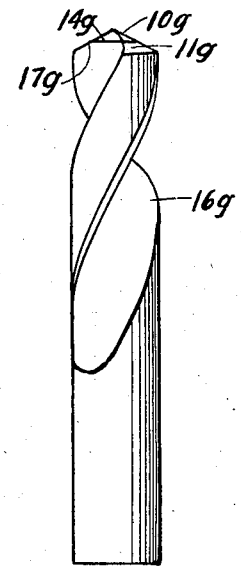
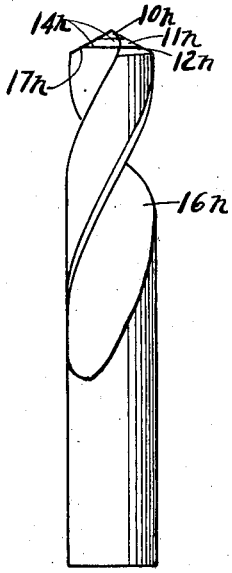
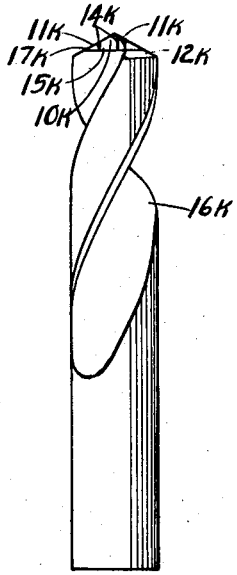
Fig 27　　　Fig 31　　　Fig 35
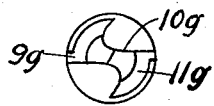
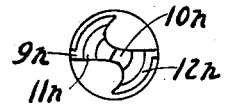
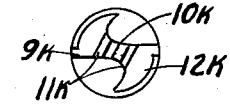
Fig 28　　　Fig 32　　　Fig 36

United States Patent Office 2,858,718
Patented Nov. 4, 1958

2,858,718

COMPOSITE TOOL BITS FOR SUBSTANTIALLY AXIALLY FED PLUNGE TYPE TOOLS

Theodor B. Kohler, Detroit, Mich.

Application December 19, 1955, Serial No. 553,796

3 Claims. (Cl. 77—70)

This invention relates to composite tool bits for substantially axially fed plunge type tools, such as drills, hollow mills and other kindred tools wherein the cutting edges cut at different speeds across their radial width.

During the past half century great strides have been made in the development of most types of cutting tools with the result that they now operate at very much higher cutting speeds. Carbon steel gave way to high speed steel, which later was to a large extent superseded by cast metal carbide, and more recently that in turn has been surpassed for many types of cutting by sintered hard metal carbide. However all these advances have not been applicable to plunge type tools for the following reasons:

Carbon steel has an efficient cutting speed range of from 0 to 50 feet per minute whereas that of high speed steel is from 0 to approximately 125 feet. Consequently much faster cutting was obtained by discarding carbon steel and adopting high speed steel; but there, so far as plunge type tools were concerned, the advance ended. This is due to the fact that metal carbides, whether cast or sintered, with which tool tips for present day rapid cutting are made, have both maximum efficient cutting speeds, usually of approximately 250 and 375 feet per minute respectively, and also relatively high minimum efficient cutting speeds, usually of approximately 100 and 225 feet respectively, below which they lose their toughness and develop a pronounced tendency to crack or break. Obviously irrespective of the peripheral speed of a drill or other plunger type tool, its speed decreases substantially to zero at its axis. Due to the above mentioned minimum cutting speed limitation of metal carbides their use for tool bits for plunge type tools proved impractical and had to be abandoned.

It is an object of this invention to provide a composite tool bit, primarily intended for plunge type tools, wherein different portions thereof are made of different materials each of which cuts most efficiently with a different speed range; wherein the efficient cutting speed ranges of the different materials overlap; wherein the portions made of different materials are welded together and are relatively so positioned that the cutting edges formed on each portion are located so that they operate within the efficient cutting speed range of the material of which that portion is made; and wherein one of the portions may be integral with and form a part of the tool shank or holder.

In this manner the invention aims to provide a composite tool bit with which cutting speeds may be materially increased. For instance if a tool bit has a high speed steel portion extending from its axis and cast metal carbide peripheral portions, the efficient cutting speed ranges of which are 0 to 120, and 100 to 250 feet per minute, respectively, then obviously the tool may be operated at a speed double that at which it could be efficiently employed if the tool were made wholly of high speed steel. Moreover the peripheral speed of such a tool may be further increased about fifty percent by using peripheral portions of sintered hard metal carbide, intermediate portions of cast metal carbide, and a portion adjacent the tool axis of high speed steel, since the maximum and minimum efficient cutting speed ranges of these three materials are approximatly: 375 to 225, 250 to 100, and 120 to 0 feet per minute, respectively.

Another object of the invention is to provide a composite tool bit consisting of a plurality of pieces of these different materials having flat surfaces thereon to provide good contacting faces so that satisfactory welds may be made between them, preferably by direct condenser discharge welding as shown and described in my United States Patent No. 2,332,581, since enlarged pictures of welds of this type of sintered hard metal carbide to cast metal carbide, or of the latter to high speed steel, disclose seams of only approximately one-thousandth of an inch in thickness.

A further object of the invention is to provide a composite tool bit consisting of a plurality of flat pieces of different materials so shaped that when welded into a unit the latter may be finished, after having been welded onto a drill shank or holder, with the expenditure of a minimum amount of labor by abrading or electric discharge grinding.

Another object of the invention is to provide such a composite tool bit made up of different materials having different characteristics wherein neither the materials themselves nor the weld seams between them lose their hardness during manufacture.

Having thus broadly stated some of the objects and advantages of the invention, I will now describe it in detail with the aid of the accompanying drawings, in which:

Figure 25 is a side view of a modified form of blank for a drill tip consisting of one piece of different material welded to the outer extremity of a metal carbide shank which also forms part of the cutting tip; the finished tip being indicated in phantom.

Figure 26 is a plan view of the blank shown in Figure 25 and the finished drill is also shown in phantom.

Figure 27 is a side view of a drill including a tip made of the parts shown in Figures 25 and 26.

Figure 28 is an end view of Figure 27.

Figure 29 is a side view of a modified form of blank for a drill tip made of two pieces of different material welded to one another also to the outer extremity of a drill shank which also forms part of the cutting tip and is made of material having different characteristics from those of the two other tip portions; the finished tip is indicated in phantom.

Figure 30 is a plan view of Figure 29.

Figure 31 is a side view of a drill including a tip made of the portions shown in Figure 29, and Figure 32 is an end view of Figure 31.

Figure 33 is a side view of a modified form of blank for a drill tip made of two different materials welded to one another and to the outer extremity of a drill shank made of still another material and which also forms a portion of the tip; wherein the weld lines between the two first mentioned materials are parallel to the axis of the drill shank and the finished tip is indicated in phantom.

Figure 34 is an end view of Figure 33.

Figure 35 is a side view of a drill including the welded tip portions shown in Figures 33 and 34, and Figure 36 is an end view of Figure 35.

Figure 1:
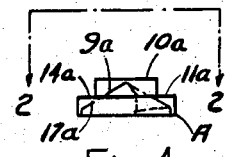
Figure 1 is a side view of a blank for a drill tip made of pieces of two different materials welded to one another, and showing in phantom outline a drill tip made thereof and having its axis at right angles to the weld lines.
Figure 5:
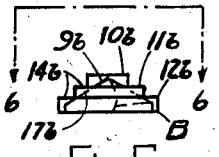
Figure 5 is a side view of a modified form of blank for a drill tip made of pieces of three different materials welded to one another, and showing a phantom outline a drill tip made thereof and having its axis at right angles to the weld lines.
Figure 9:
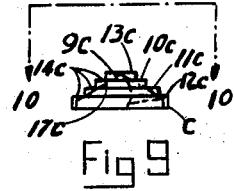
Figure 9 is a side view of a modified form of blank for a drill tip made of pieces of four different materials welded to one another, and showing a drill tip made thereof in phantom outline; the tip having its axis at right angles to the weld lines.
Figure 2:
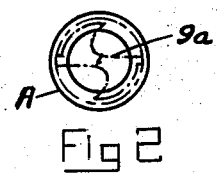
Figure 2 is a plan view of the blank taken on the line 2—2 of Figure 1.
Figure 6:
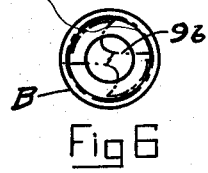
Figure 6 is a plan view on the line 6—6 of Figure 5 wherein the tip is again shown in phantom outline.
Figure 10:
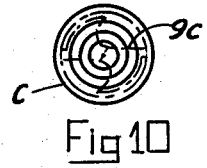
Figure 10 is a view taken on the line 10—10 of Figure 9 wherein the tip is shown in phantom outline.
Figure 3:
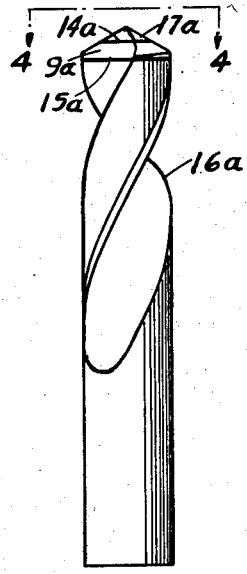
Figure 3 is a side view of a drill including a tip made from the blank shown in Figures 1 and 2.
Figure 7:
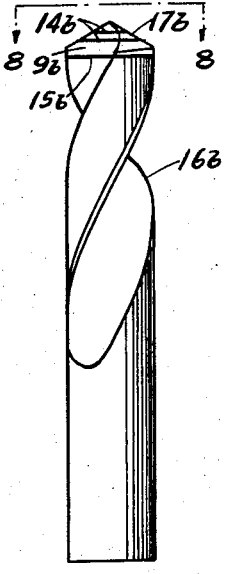
Figure 7 is a side view of a drill including a tip made from the blank shown in Figures 5 and 6.
Figure 11:
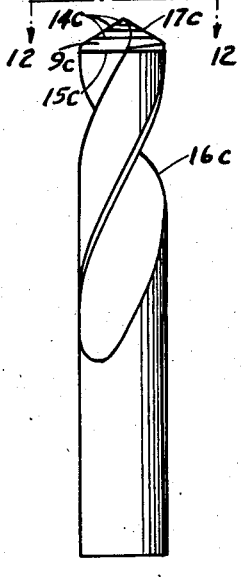
Figure 11 is a side view of a drill including a tip made from the blank shown in Figure 9.
Figure 4:
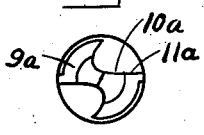
Figure 4 is an end view thereof shown on the line 4—4 of Figure 3.
Figure 8:
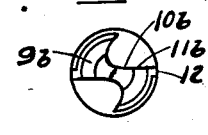
Figure 8 is an end view taken on the line 8—8 of Figure 7.
Figure 12:
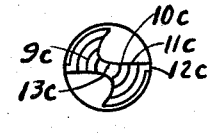
Figure 12 is an end view on the line 12—12 of Figure 11.

Referring to Figures 1 to 4, inclusive, the composite blank A of which the cutting tip 9a is formed consists of a smaller flat piece 10a of high speed steel which is circular in section and is concentrically secured by direct condenser discharge welding indicated at 14a upon a larger flat piece 11a of cast metal carbide also of circular section. It is found that by employing this type of welding, which is practically instantaneous and makes a seam or weld of only approximately one-thousandth of an inch in thickness, that the hardness of the pieces is in no wise affected thereby. The high speed steel piece 10a is heat treated prior to being welded to the cast metal carbide piece 11a, while the hardness of the latter, in fact of all metal carbide whether cast or sintered, can only be changed by metalurgical treatment and is not affected by heat treating or tempering.

The underside of the larger piece 11a is then welded at 15a onto the outer extremity of a non-cutting drill shank or body 16a of suitable metal. This is also done by direct condenser discharge welding. It will be noted that the piece 11a in this case is thicker than the piece 10a because the depth of the latter should be such that it terminates where the diameter of the tapered peripheral portion 17a of the tip is only substantially one-half the diameter of the drill shank or body 16a, whereas the underside of the piece 11a should extend somewhat beneath the larger end of the tapered cutting portion to permit regrinding of the latter while maintaining the outer extremity of the said body spaced from the said tapered cutting portion.

The maximum speed of the tapered cutting edges formed around the periphery of the high speed steel piece 10a is then substantially one-half that of the cutting edges formed on the cast metal carbide piece 11a around its periphery. However since the maximum efficient cutting speeds of high speed steel and cast metal carbide are in a ratio of approximately 1 to 2, namely about 125 and 250 per minute respectively, and their minimum efficient cutting speeds are approximately 0 and 100 feet per minute respectively, very rapid and efficient cutting may be done by this composite cutting tip.

In the modification shown in Figures 5 to 8, inclusive, the composite blank B of which the cutting tip 9b is made, consists of a flat piece 10b of high speed steel of circular section concentrically welded upon a flat piece 11b of cast metal carbide of equal thickness but of larger diameter. The piece 11b is in turn concentrically welded upon a flat piece 12b of sintered hard carbide, again of circular section but of still larger diameter. The piece 12b is also somewhat thicker than the pieces 10b and 11b. The seams or welds 14b are made by direct condenser discharge welding, and the high speed steel piece 10b is again heat treated prior to being welded to the cast metal carbide piece 11b. The largest piece 12b is subsequently welded at 15b to the outer extremity of a drill shank or body 16b and the drill is ground to form the cutting edges on the tapered cutting portions 17b of the tip. The greater depth of the piece 12b provides sufficient length to space the tapered sides of the tip far enough from the drill body to permit regrinding of the said tapered sides.

In this instance since the maximum efficient cutting speeds of the three materials of which the pieces 10b, 11b and 12b are made are approximately 375, 250 and 125 feet per minute respectively, the axial depth of the tapered cutting edges 17b for each of the pieces is substantially the same; and the tapered cutting edges on the piece 10b extend from and across the axis of the drill tip. Thus a composite cutting tip is provided wherein the maximum cutting speed of each of its three components, the pieces 10b, 11b and 12b, may be employed to obtain very high cutting speed.

In the modification shown in Figures 9 to 12, inclusive, the composite block C of which the cutting tip 9c is made is similar to that shown in Figures 5 to 8 inclusive, except that a fourth and still smaller piece 13c of circular section is concentrically welded at 14c on the outer face of the high speed steel piece 10c. This piece 13c is made of carbon steel or any tough metal composition which will withstand pressures thereon due to its negative cutting angle when the piece is ground to form the chisel point of a drill tip. In this case the thickness of the piece 13c and of the piece 10c together make up substantially one-third the axial depth of the tapered cutting portions 17c, while the remaining two-thirds of the axial depth is formed one-half on each of the pieces 11c and 12c, which are again made of cast metal carbide and sintered hard metal carbide respectively, and the piece 12c is again welded to a drill body 16c at 15c.

In this case both the smallest piece 13c, if made of carbon steel or other ferrous metal, as well as the high speed steel piece 10c, are each separately heat treated prior to being welded by direct condenser discharge welding to one another and the piece 10c to the cast metal carbide piece 11c, because the two ferrous metal pieces 13c and 10c require treatment at different temperatures and for different lengths of time. In the three embodiments of my invention so far described the seams or weld lines between the pieces which together form the tool bit extend at right angles to the axis of the drill body to which it is applied.

In the modification shown in Figures 13 to 16, inclusive, the composite blank D of which the drill tip 9d is made, consists of a central high speed steel piece 10d to opposite sides of which cast metal carbide pieces 11d are welded at 14d so that the weld lines or seams extend parallel with the axis of the drill tip and this axis passes through the piece 10d centrally of its width. To obtain maximum cutting efficiency at high speeds from this composite tool the distance from the drill tip axis along an imaginary line extending at right angles to the weld lines above mentioned to each weld should be one-half the radial width of the tip when finished. Thus when the pieces are being welded to one another the thickness of each carbide piece 11d should be somewhat more than one-half that of the central high speed steel piece 10d. The inner extremities of the piece 10d and the pieces 11d are welded at 15d to the outer face of the drill body 16d after which the inclined cutting edges 17d are ground.

Figure 13:
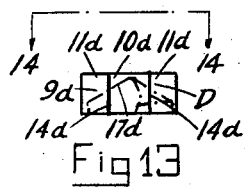
Figure 13 is a side view of a modified form of blank for a drill tip made of pieces of two different materials welded to one another, and showing in phantom outline a drill tip made thereof and having its axis substantially parallel to the weld lines.
Figure 17:
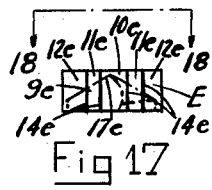
Figure 17 is a plan view of a modified form of blank for a drill tip made of pieces of three different materials welded to one another, and showing in phantom outline a drill tip made therefrom and having its axis substantially parallel to the weld lines.
Figure 21:
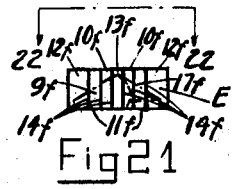
Figure 21 is a plan view of a modified form of blank for a drill tip made of pieces of four different materials welded to one another, showing in phantom outline a drill tip made thereof and having its axis substantially parallel with the weld lines.
Figure 14:
Figure 14 is a plan view of the blank taken on the line 14—14 of Figure 13.
Figure 18:
Figure 18 is a plan view on the line 18—18 of Figure 17.
Figure 22:
Figure 22 is a side view of the blank taken on the line 22—22 of Figure 21.
Figure 15:
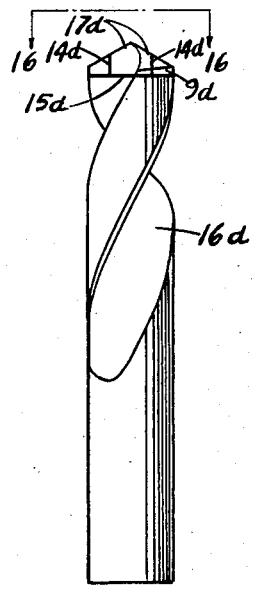
Figure 15 is a side view of a drill on which a tip made from the blank shown in Figures 13 and 14 is welded.
Figure 19:
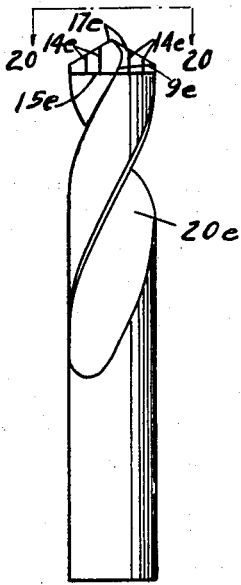
Figure 19 is a side view of a drill having a tip thereon made from the blank shown in Figures 17 and 18.
Figure 23:
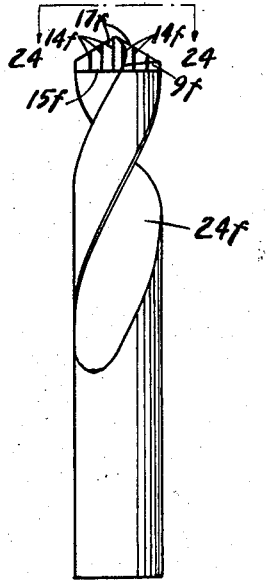
Figure 23 is a side view of a drill on which a tip made from the blank shown in Figures 21 and 22 is welded.
Figure 16:
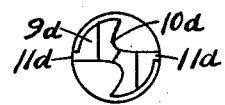
Figure 16 is an end view on the line 16—16 of Figure 15.
Figure 20:
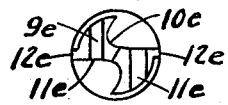
Figure 20 is an end view on the line 20—20 of Figure 19.
Figure 24:
Figure 24 is an end view taken on the line 24—24 of Figure 23.

In the modification shown in Figures 17 to 20, inclusive, the composite blank E from which the drill tip 9e is made is similar to that shown in Figures 13 and 14 except that it consists of pieces of three different materials welded to one another along weld lines or seams 14e parallel with the axis of the drill tip, and having their inner edge faces welded at 15e to the outer face of the drill body 16e. The central piece 10e of the drill tip 9e is made of high speed steel, and welded to opposite sides of the latter are cast metal carbide pieces 11e. Welded to the outer faces of the cast metal carbide pieces are sintered hard metal carbide pieces 12e. The width of the pieces is relatively such that they are each adapted, at their cutting edges farthest from the drill tip axis, to cut at substantially their maximum efficient cutting speed. The axis of the tip of course passes centrally through the high speed steel piece 10e parallel with the weld lines 14e.

In the modification shown in Figures 21 to 24, inclusive, the drill tip 9f is similar to that shown in Figures 17 to 20 except that the blank F is made of pieces of four different materials and includes a relatively narrow piece 13f of carbon steel or other tough material which will retain a cutting edge when operating at a negative rake as when the chisel point of a drill is formed thereon. To the opposite sides of the piece 13f flat pieces of high speed steel 10f are welded; to the outer sides of the high speed steel pieces cast metal carbide pieces 11f are welded, and similarly secured to the outer sides of the latter are sintered hard metal carbide pieces 12f. All the weld lines are indicated at 14f parallel with the axis of the drill tip to form seams connecting the various pieces which together make up the tip 9f to one another. In this case again the relative widths of the pieces 10f, 11f, 12f and 13f are such that each may be employed to cut at its maximum effective speed. The piece 13f extends across the axis of the tip and is of sufficient width for the chisel point of a drill to be formed thereon. The inner faces of all the pieces 10f, 11f, 12f and 13f are again welded at 15f to the outer face of the drill body or shank 16f.

In the modification shown in Figures 25 to 28, inclusive, the general arrangement is practically the same as that shown in Figures 1 to 4, inclusive, except that the piece of larger diameter 11g is integral with and forms part of the drill shank or body 16g which in this case is made of cast metal carbide. Concentrically welded at 14g upon the outer face of the piece 11g is a flat high speed steel piece 10g of smaller circular section so that the drill tip 9g in this instance consists of the said high speed steel piece together with the outer portion 11g of the drill body or shank 16g to which it is welded, subsequent to which the tapered peripheral portions 17g of the tip are ground. This type of composite drill tip is cheap and easy to manufacture, due in part to the fact that only one weld is required; such a composite drill tip is very economical for drilling cast iron, for example, when only relatively short holes are needed; and again a cast metal carbide drill body is highly resistant to wear so long as its speed of rotation is relatively high.

The modification shown in Figures 29 to 32, inclusive, differs from the construction shown in Figures 5 to 8 only in the fact that the sintered hard metal carbide piece 12h is integral with and forms part of the drill body or shank 16h which is also made of sintered hard metal carbide. Concentrically welded to the outer face of the sintered hard metal carbide piece 12h and smaller in cross section than the latter is a cast metal carbide piece 11h, and concentrically welded upon the cast metal carbide piece is a high speed steel piece 10h of yet smaller section. 17h denotes the inclined peripheral cutting faces of the drill tip, and 14h indicates the welds between the pieces 10h and 11h, and 11h and 12h. This type of drill tip is also highly satisfactory for operating under relatively low torque conditions.

In the modification shown in Figures 33 to 36, inclusive, the drill tip 9k is similar to that shown in Figures 17 to 20, except that in this instance the drill body 16k is integral with and forms part of a sintered hard metal carbide piece 12k, of which metal the said body is made. The inner edge faces of both a central high speed steel piece 10k, through which the axis of the drill tip passes, and those of outer cast metal carbide pieces 11k are all welded at 15k to the outer face of the sintered hard metal carbide piece 12k; and the adjacent faces of the high speed steel piece 10k and of the cast metal carbide piece 11k are joined to one another by welds 14k which extend parallel to the axis of the drill tip.

What I claim is:

1. A composite plunge type tool bit comprising at least one flat ferrous metal piece and at least one flat carbide metal piece, said pieces bearing against one another and being welded to each other throughout their juxtaposed surfaces, said welded pieces together forming a substantially conical unit having a ferrous metal piece extending across its apex, said unit having cutting edges formed therealong, the weld extremities extending to the cutting edges intermediately of the length of said edges, and the cutting edges continuing uninterruptedly across said pieces and said weld extremities.

2. A composite plunge type tool bit including at least one flat ferrous metal piece and at least one flat carbide metal piece, said pieces bearing against and being welded to one another throughout their juxtaposed surfaces, said welded pieces together forming a substantially conical unit having a ferrous metal piece extending across its apex, said metal pieces being disposed substantially at right angles to the axis of the conical unit, and said unit having cutting edges formed therealong, each cutting edge extending uninterruptedly across all said pieces and across the weld extremities between said pieces.

3. A composite plunge type tool bit comprising at least one flat ferrous metal piece and at least two flat carbide metal pieces, said pieces bearing against and being welded to one another throughout their juxtaposed surfaces, said welded pieces together forming a substantially conical unit having a ferrous metal piece extending across its apex, said metal pieces being disposed substantially parallel to the axis of said unit, and said unit having cutting edges formed therealong which continue uninterruptedly across both the ferrous and carbide metal pieces and across the weld extremities between said pieces.

References Cited in the file of this patent

UNITED STATES PATENTS

| | | |
|---|---|---|
| 1,901,654 | Kerr | Mar. 14, 1933 |
| 2,294,969 | Engvall et al. | Sept. 8, 1942 |

FOREIGN PATENTS

| | | |
|---|---|---|
| 160,317 | Australia | Dec. 20, 1954 |

OTHER REFERENCES

"Automobile Engineer" (Great Britain), Cemented Carbides, pages 59 to 62, published February 1944.